(12) United States Patent
Theoret et al.

(10) Patent No.: US 9,665,561 B2
(45) Date of Patent: May 30, 2017

(54) SYSTEM AND METHOD FOR PERFORMING ANALYSIS ON INFORMATION, SUCH AS SOCIAL MEDIA

(71) Applicant: Nexalogy Environics Inc., Montreal (CA)

(72) Inventors: Claude G. Theoret, Montreal (CA); Guido Vieira, Montreal (CA)

(73) Assignee: Nexalogy Environics Inc., Montreal (CA)

( * ) Notice: Subject to any disclaimer, the term of this patent is extended or adjusted under 35 U.S.C. 154(b) by 0 days.

(21) Appl. No.: 14/978,170

(22) Filed: Dec. 22, 2015

(65) Prior Publication Data

US 2016/0110342 A1 Apr. 21, 2016

Related U.S. Application Data

(62) Division of application No. 13/705,940, filed on Dec. 5, 2012, now Pat. No. 9,275,015.

(Continued)

(51) Int. Cl.
*G06F 17/27* (2006.01)
*G06F 17/21* (2006.01)

(52) U.S. Cl.
CPC ............ *G06F 17/277* (2013.01); *G06F 17/21* (2013.01)

(58) Field of Classification Search
CPC .. G06F 17/2755; G06F 17/2818; G06F 17/24; G06F 17/277; G06F 17/2735; G06F 17/30985; G06F 21/10; G06F 2221/0737; G06F 2221/2107; G06F 17/2715; G06F 17/2775; G06F 17/2872; G06F 17/3071; G06F 17/2785; G06F 17/27; G06F 17/30684; G06F 17/30598; G06F 17/274;

(Continued)

(56) References Cited

U.S. PATENT DOCUMENTS

2005/0091031 A1* 4/2005 Powell ................. G06F 17/273 704/4
2010/0318398 A1 12/2010 Brun et al.
2011/0295593 A1 12/2011 Raghuveer

FOREIGN PATENT DOCUMENTS

WO WO 2008/083504 A1 7/2008

OTHER PUBLICATIONS

International Search Report corresponding to International Application No. PCT/CA2012/050875; International filing date: Dec. 5, 2012; Date of mailing of the International Search Report: Feb. 26, 2013; 3 pages.

* cited by examiner

*Primary Examiner* — Huyen Vo
(74) *Attorney, Agent, or Firm* — Myers Bigel, P.A.

(57) ABSTRACT

A system for analyzing text-based information is presented. Each datum of information includes an author, a description and a timestamp. A fetcher fetches the raw information according to keywords. A parser parses the raw information to refine the results. A lexicon management module extracts lemmas from the raw information, and creates an edited lexicon containing the raw data and the lemmas for each datum. A data manager correlates lemmas in the edited lexicon and identifies clusters of lemmas that are correlated between each other. The results can be visually displayed to a user, and clusters of lemma that are less correlated than the other clusters can be visually identified. In one aspect, the user is able to excise the less correlated clusters, in order to further refine the results of the keyword search.

7 Claims, 15 Drawing Sheets

Related U.S. Application Data

(60) Provisional application No. 61/566,715, filed on Dec. 5, 2011.

(58) Field of Classification Search
CPC ......... G06F 17/30705; G06F 17/30734; G10L 15/1822
USPC .............. 704/1–10, 250, 251, 255, 257, 270
See application file for complete search history.

| A | B | C | D | E | F | G | H |
|---|---|---|---|---|---|---|---|
| light | 1321 | faster | 1.007738 | 1209 | | | |
| light | 1321 | theory | 0.618234 | 793 | | | |
| light | 1321 | travel | 0.570159 | 783 | | | |
| light | 1321 | speed | 0.268054 | 316 | | | |
| light | 1321 | time | 0.223422 | 355 | | | |
| faster | 1098 | light | 1.007738 | 1209 | | | |
| faster | 1098 | theory | 0.626859 | 728 | | | |
| faster | 1098 | travel | 0.571986 | 715 | | | |
| faster | 1098 | time | 0.228068 | 327 | | | |
| faster | 1098 | speed | 0.208361 | 254 | | | |
| travel | 814 | faster | 0.571986 | 715 | | | |
| travel | 814 | light | 0.570159 | 783 | | | |
| travel | 814 | theory | 0.359975 | 475 | | | |
| travel | 814 | time | 0.23698 | 287 | | | |
| travel | 814 | space | 0.190225 | 213 | | | |
| theory | 770 | faster | 0.626859 | 728 | | | |
| theory | 770 | light | 0.618234 | 793 | | | |
| theory | 770 | travel | 0.359975 | 475 | | | |
| theory | 770 | time | 0.179595 | 243 | | | |
| theory | 770 | relativity | 0.175035 | 165 | | | |
| time | 427 | travel | 0.23698 | 287 | | | |
| time | 427 | faster | 0.228068 | 327 | | | |

FIG. 7

SYSTEM AND METHOD FOR PERFORMING ANALYSIS ON INFORMATION, SUCH AS SOCIAL MEDIA

RELATED APPLICATIONS

This application is a divisional application of pending U.S. patent application Ser. No. 13/705,940, filed Dec. 5, 2012, which claims the benefit of and priority to U.S. Provisional Patent Application No. 61/566,715 filed Dec. 5, 2011, the disclosures of which are incorporated herein by reference as if set forth in their entireties.

FIELD OF THE INVENTION

The present invention relates to a system and method for performing analysis on textual information and social data, such as blogs, twitter, emails, etc., or any textual data with an author, content and time stamp.

BACKGROUND OF THE INVENTION

Text-based social data, such as blogs, are more and more prevalent, and deep within social data, useful information may be contained. Indeed, social data may include valuable information about a particular product as seen in the social data network, i.e. what comments have users made with respect to a particular product or service. In addition, social data such as blogs or tweets may be related to a company, or to a sector of activity of a company.

The persons who generate text-based social data on web logs (blogs), social networking sites, or any online forum, are referred to as "bloggers". Bloggers produce a variety of different types of information, such as personal diaries, experiences (such as food, travels), opinions (on products, services, people, politics and politicians), to name but a few.

One aspect of blogging is the unregulated, spontaneous and collective expression of ideas. The collective information produced by bloggers is significant, in that an analysis of this data can provide insight into public opinion on products, political views, companies, entertainer, public figures, etc. In a sense, the blogosphere can become a source of competitive intelligence for analyzing the usefulness of a given marketing campaign; public relations strategies, public response to a given product or service, and the like.

In contrast to web pages or wikis, social data is linked with a date stamp and publisher information, which provides a temporal reference point and an associated actor. This date stamp can be used to track and analyze over time the information generated in social media. The temporal aspect of social media is also interesting in that a post, or a number of posts, can trigger additional posts by the same or other bloggers.

Another aspect to social data entries is that over time, one or more persons may become "influencers" to the greater community. For example, a blogger who regularly writes about a particular issue, and gathers a large following, will generally be more influential than an ad hoc blogger, or one who may write regularly on unrelated topics.

However, there are some considerable issues in trying to sort through the information contained in social data, in order to produce insights. First of all, social data is often not neatly categorized by topic. Secondly, social data often contains spam, or other undesirable entries, such as porn, which makes searching through blogs irritating at best, and misleading at worst.

There exist many different search engines on the Internet, one of the examples being blogs search engines. Blog search engines enable searching through the blogs have been previously indexed. However, raw searching rarely produces useful results, or produces so many results that it is far too time consuming to manually sort through the results. Even a well designed search filter often yields far too much information. Also, traditional search engines are based on crawlers, which index vast amounts of information, but these crawlers are not adapted to index social entries that are additionally defined by their temporal aspect.

Social Data Providers offer APIs (application programming interfaces) so that third parties may access the information catalogued and indexed. Of course, this access is "raw", i.e. it is unformatted and unorganized.

Another term known the art is "fire hosing". In fire hosing, one would go directly to a source of information such as Google or Twitter, and "get" all the information related to a given query, or queries. Then the data is cleaned up. This technique has the disadvantage or getting considerable amounts of information, and is non-discriminatory, in that it would include, inter alia, spam and porn.

It is also known in the art that the current rate of expansion of information on social media networks roughly doubles every 6-8 months.

Some social data providers have developed "crawlers", software applications that "crawl" the web, and perform indexing functions. In some cases, information contained on social media websites can be indexed by these crawlers, but the indexing that is performed is rudimentary. Another drawback of crawling is that given the vast amount of information that is contained in social media, the index is often outdated, sometimes by as much as 6 months. This means that if the conventional wisdom rule of expansion of social media of doubling every six months or so is true, then crawlers will miss about half the relevant information.

There have been attempts to address these and other issues, for example, as described in US patent application no. US 2009/0319518 A1 to Koudas et al. Koudas et al. teach a method for searching text sources which include temporally ordered data objects. In the method, access is provided to the text sources including the temporally-ordered data objects. A search query based on terms and time intervals is obtained or generated, in addition to obtaining or generating time data associated with the data objects, which are then identified based on the query. Koudas et al. then generate a popularity curve based on the frequency of data objects corresponding to one or more of the search terms in the one or more time intervals.

OBJECT AND SUMMARY OF THE INVENTION

The system of the present invention, in its broad terms, is a data oriented platform for initiating and completing end to end studies and analysis on text based social media. It incorporates modules for data capture, data preparation, reporting, statistics and classifying and data mining different kinds of social media. In addition it is fully multi-user and multi-project, allowing several individuals to work on several projects at once or on one project simultaneously.

In accordance with an aspect of the invention, there is provided a system for analyzing text-based information, each datum of information including an author, a description and a timestamp, the system comprising:
  i. a fetcher for fetching raw information;
  ii. a parser for parsing the raw information;

iii. a lexicon management module for extracting from the raw information lemmas, and creating an edited lexicon containing the raw data and the lemmas for each datum; and iv. a data manager for correlating lemmas in the edited lexicon and for identifying clusters of lemmas that are correlated between each other.

In accordance with another aspect of the invention, there is provided a method for visually identifying spam in a text-based dataset, comprising the steps of:

calculating a correlation between combinations of words;

concatenating lemmas that have a correlation $K_{ij}$ above a predetermined level into an artificial word;

recalculating a correlation $K_{ij}$ between combinations of words in an expanded dataset comprised of said text-based dataset and artificial words obtained by concatenation;

repeating the steps above for N lemmas; and using a force directed graph to visually display the results obtained above, wherein each node in the graph has N outgoing partners, and the N co-words with the highest value of $K_{ij}$ above a minimum value are connected together.

BRIEF DESCRIPTION OF THE DRAWINGS

The present invention will be better understood after reading a description of at least one preferred embodiment thereof, made with reference to the following drawings, in which:

FIG. 7 is a representation of the correlation table between keyword pairs;

BRIEF DESCRIPTION OF A PREFERRED EMBODIMENT OF THE PRESENT INVENTION

Figure 1:
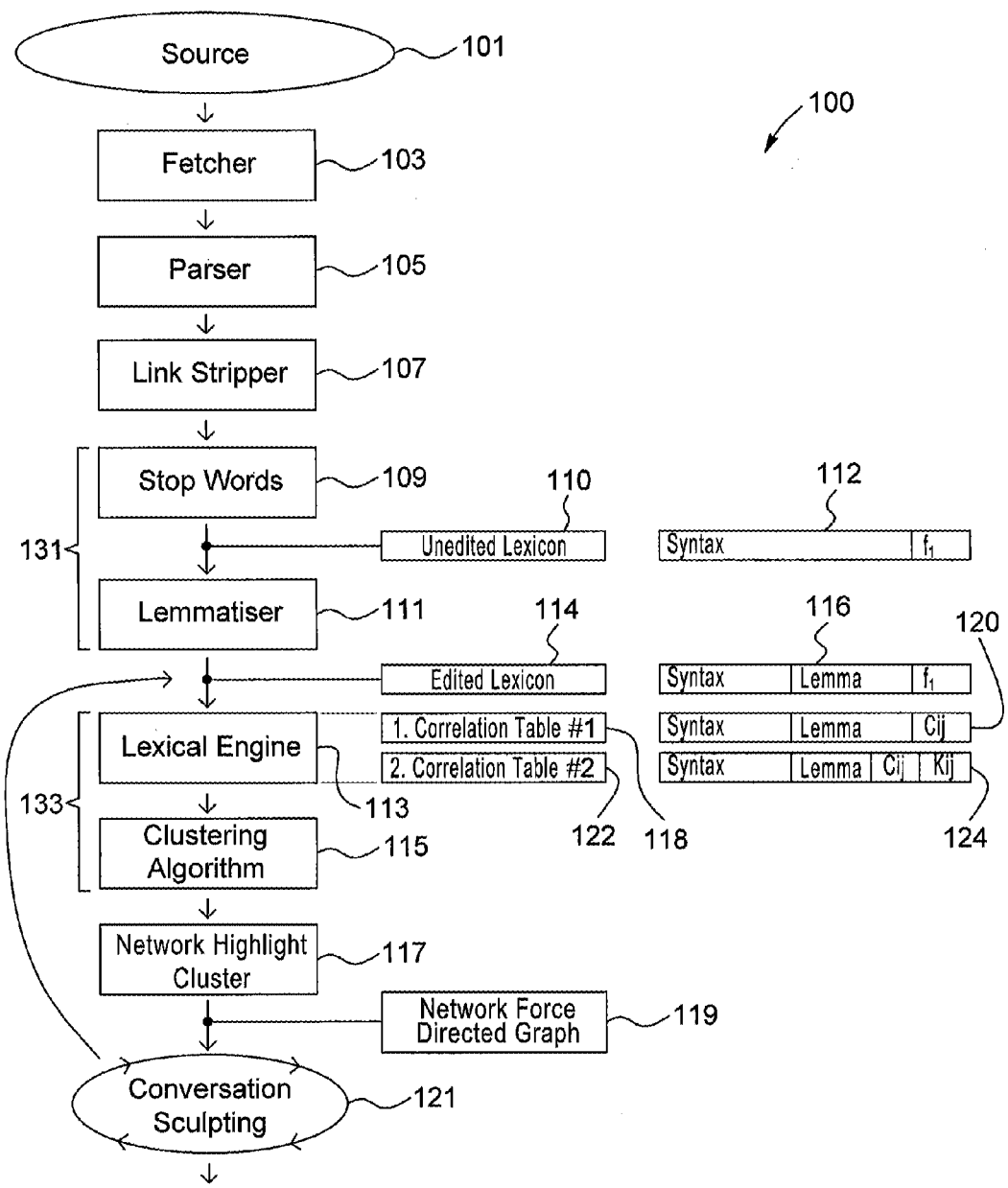
FIG. 1 is a schematic representation of the flow of the process, according to an embodiment of the invention.

The following description outlines the basic components of the system and illustrates some of its modules and user interfaces. It will be apparent to a person skilled in the art that the system of the present invention is advantageously, if not exclusively, adapted for implementation on a computer system, and that the method of the invention will be implemented also on a computer system. The reader is assumed to have adequate knowledge of computer system architecture, and that the components and algorithms can be coded under any platform using any computer language.

The description will start with a brief overview of the system, providing a basic familiarity of the system's major functions and features. Detailed explanation of the different sub-systems will then be presented.

As with any multi-user system the initial step to its usage is via a login. There are currently three levels of user access: Super Administrator, Administrator, and Analyst, defined as follows:

Super Administrator—This role allows changes to the system and/or projects, and has no restrictions of any kind with regards to modifying parameters. The Super Administrator can also manage users and access permissions.

Administrator—This role is assigned to Project Managers or Project Leads; those that are responsible for delivering projects. This allows creation and modification of projects. Assigning of projects to other users and granting of access to Analysts assigned to various projects. They have access to all aspects of a project they have created or have been assigned to them.

Analyst—This role is assigned to Content Analysts and other users who will actively work on certain parts of a project. They cannot modify projects, although they have access to certain relevant features within the project.

The Projects Management module is where all the main projects that the user has access to are presented. A Super Administrator by default will be able to see all projects. All other users will see projects that either have been assigned to them or that they are responsible for.

Search Design

The Search Design Interface module is a data gathering and collection tool for social media. It is adapted to directly and interactively test search parameters and keywords, and then download these for preparation in the next step of a project. As the basic interfaces of the present invention are ubiquitous in the software and IT worlds, they will not be detailed herein, and are included here for the sole purpose of providing context to the reader.

To add a search, a user just needs to click on the "Add Search" button, which will bring up the search panel.

The search panel represents all the necessary fields require to conduct a social data search and data capture, including searches across date ranges.

Once entered, the user can retrieve the data, and the number of posts (in this example for a blog search) will be returned. Other features have been built into the panel, including mouse overs that quickly let the user identify details of each search, without reopening up the search entry panel.

In addition to this, there are sophisticated options for query duplication. For example a user can create a search template, and using a list of keywords in for example a .CSV format, the system will populate the Data Capture module with corresponding searches. Searches can then be captured individually, or batch captured as the user desires.

The Data Preparation module is a multi-function module that incorporates various tools for preparing data for the later stages of analysis. In addition there are data inspection, import and export functions to get data in and out of the system. Users can either directly use data that was captured using the "Data Capture" module or import data from previous studies or other applications. A standard Social Media File Format has been defined across all modules and applications to ensure cross-platform compatibility.

While the most of the features in the Data Preparation module are fairly straightforward, the module advantageously includes a Scoring Manager. The Scoring Manager is adapted to allow rapid and sophisticated human analysis of large social media data sets. Clicking on the "Open Scoring Manager" button brings up the Scoring Manager form. Social Data that was captured previously in the data capture module are presented with relevant information, including the number of posts that were captured. Various information about the social data is presented including information about author, date and time of creation or publication and any hyperlinks referring back to the source of the data.

Figure 2:
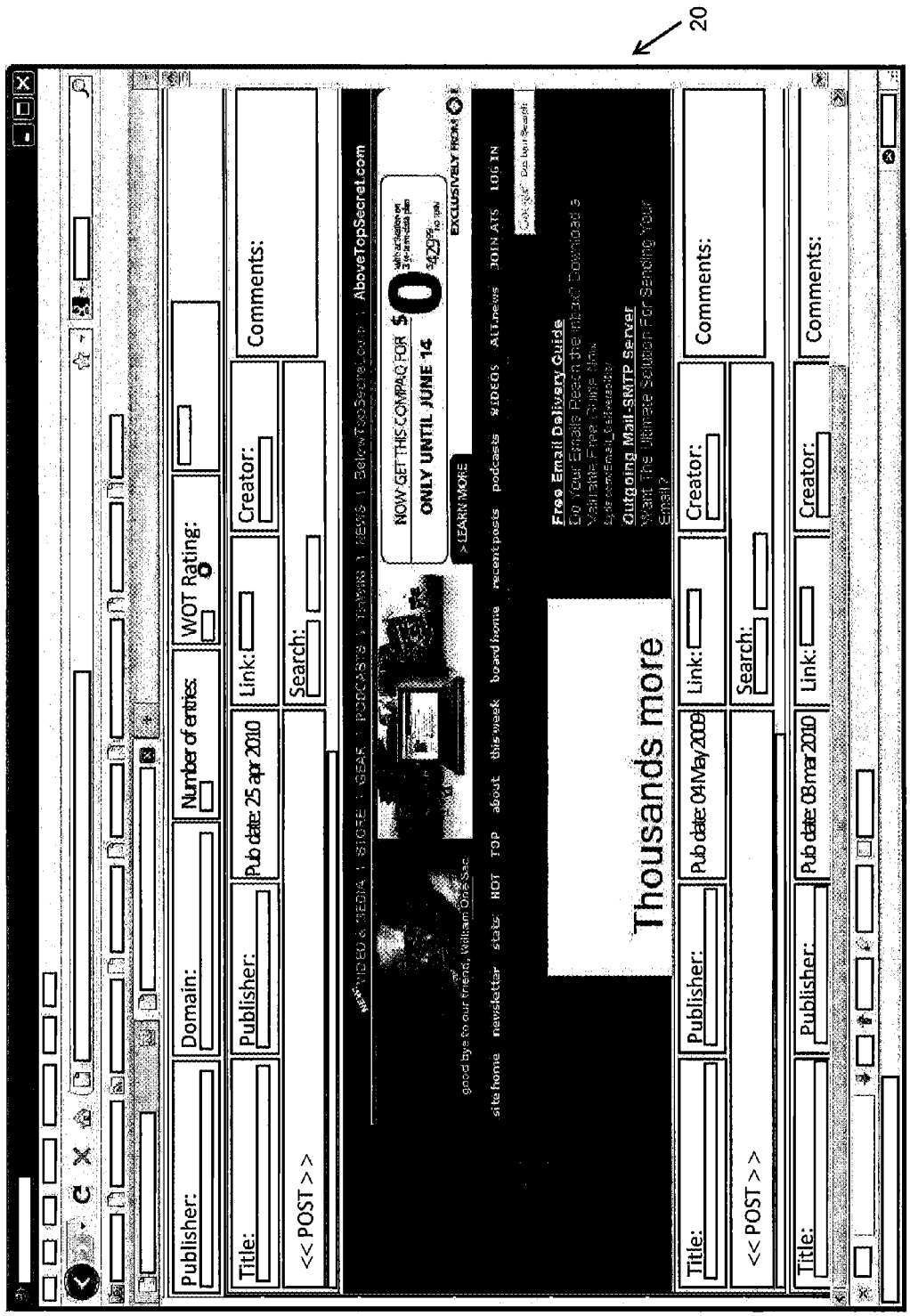
FIG. 2 is a screen shot of a datum of information.

The user can read the text contained in the post (i.e. the text that contained the keywords form the search it originated in during data capture). Should he or she which to view the source of the data 20 and there are links to it, they can click "Open" and the original data is presented to them directly (see FIG. 2).

Figure 3:
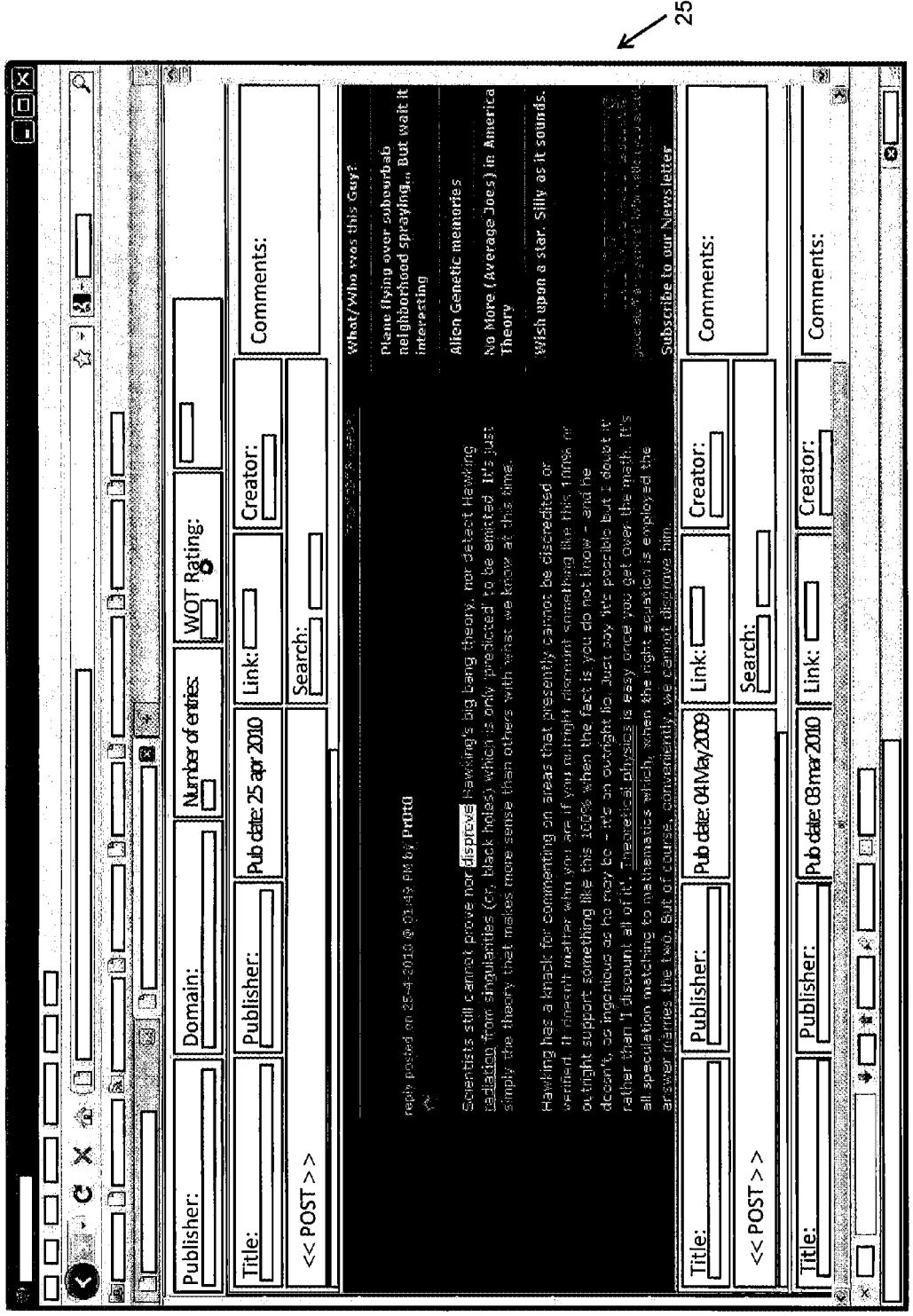
FIG. 3 is a screen shot of the datum of information of FIG. 2, with the keyword highlight in the post.

A set of clickable hyperlinks are created from the text in the social data, and are available to the user at any time. The user can click on the word and it will be found and presented in the post to the user. An example of this can be seen in FIG. 3 where the post 25 is shown with a highlighted word. In this case, the user selected to view the word "disprove" and was presented with the word highlighted in the corresponding text in the post.

Figure 4:
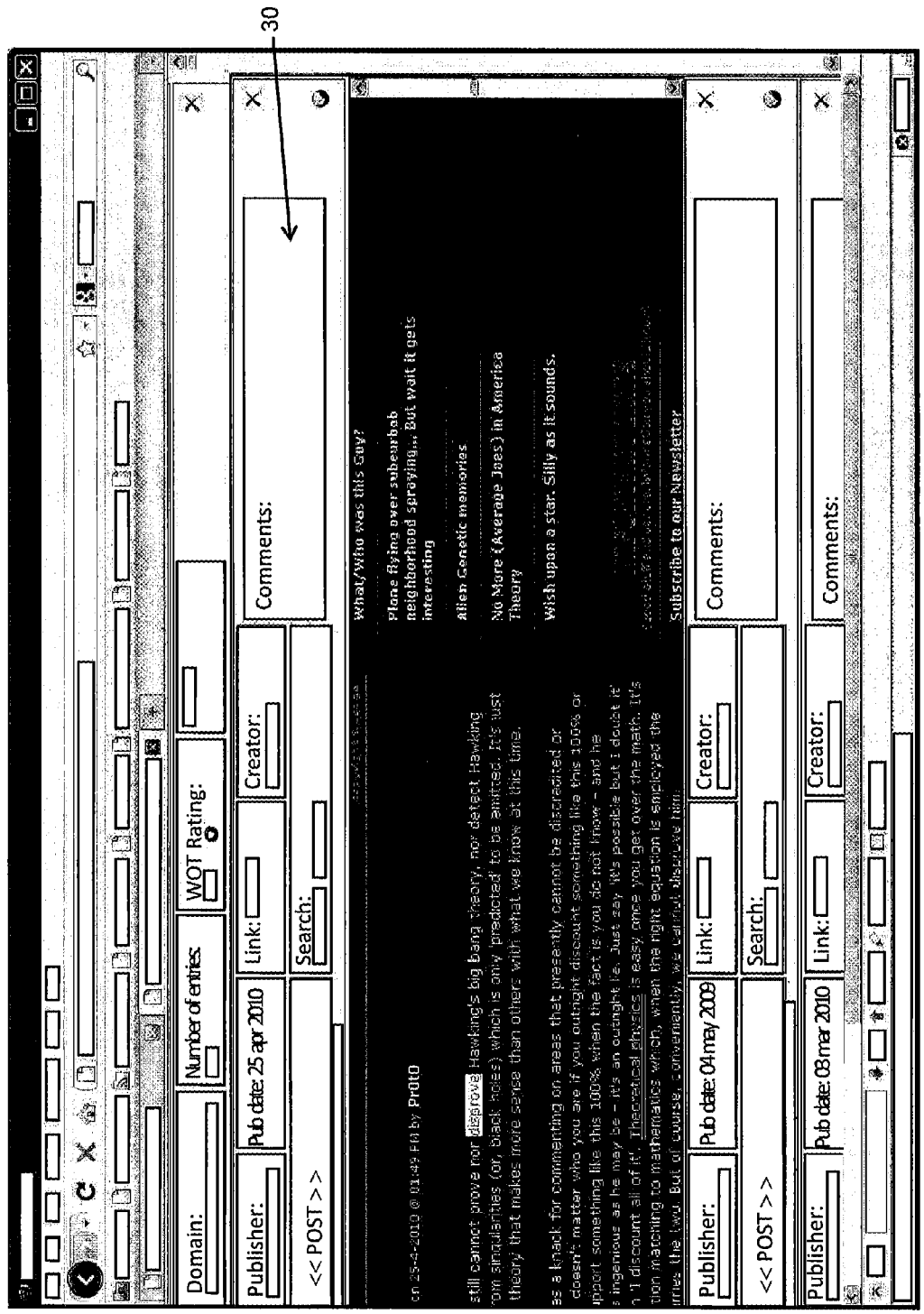
FIG. 4 is a screen shot of the datum of information with the comment section highlighted.

Finally the user can enter comments 30 about the post into the system for later compilation and analysis. This can be seen in FIG. 4 on the right hand side.

The Scoring Manager module allows much more rapid human analysis than was available before, as well as minimizing errors and ensuring data quality in addition to adding custom defined metadata.

Lexicon

The lexicon is a "dictionary" of words which are used in the final stages for various kinds of analysis (most importantly the lexical analysis, which will be discussed below). It represents the lemmatization of individual words in the data set, and allows various forms of regrouping and/or removal of irrelevant concepts that should not be presented in later stages of data mining and reporting. In one sense the lexicon provides a cleaning of the data.

Reporting/Analysis

The final module (and generally stage) in a project is the Reporting/Analysis module. It offers various reporting and analysis options.

Figure 5:
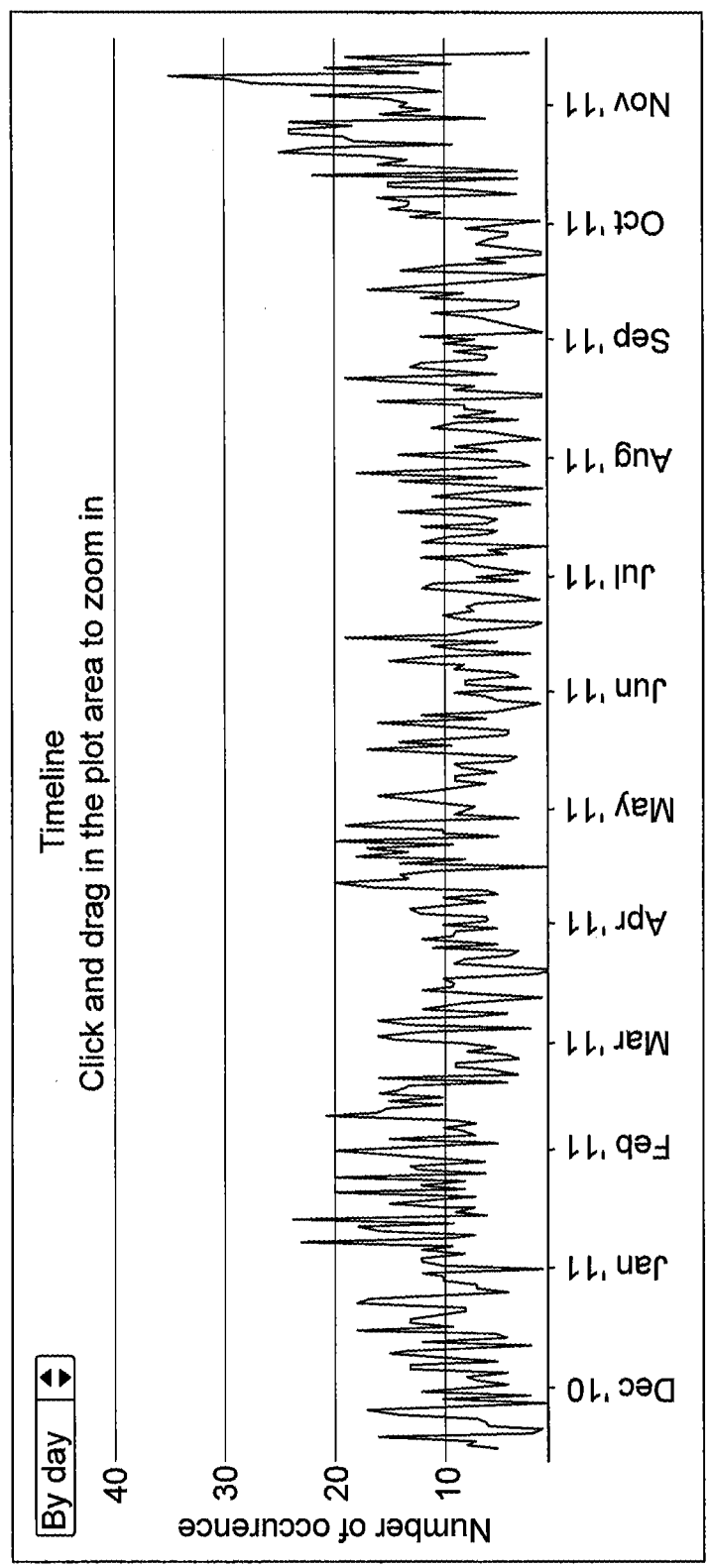
FIG. 5 is a graph showing the hypothetical occurrence of a keyword plotted along a timeline.

The first option for generation is an export or view of the timeline of posts by date. This provides a count of the number of posts of the data set on a specific data, and is importable into for example spreadsheet type software, with button 31. A graph of the data allows easy visualization of spikes and/or general high and low patterns within the data set (FIG. 5).

The timeline can be critical in social media studies where flashpoints or important events need to be viewed over time. In addition it can easily show the evolution of a data set over a given time period.

Figure 6:
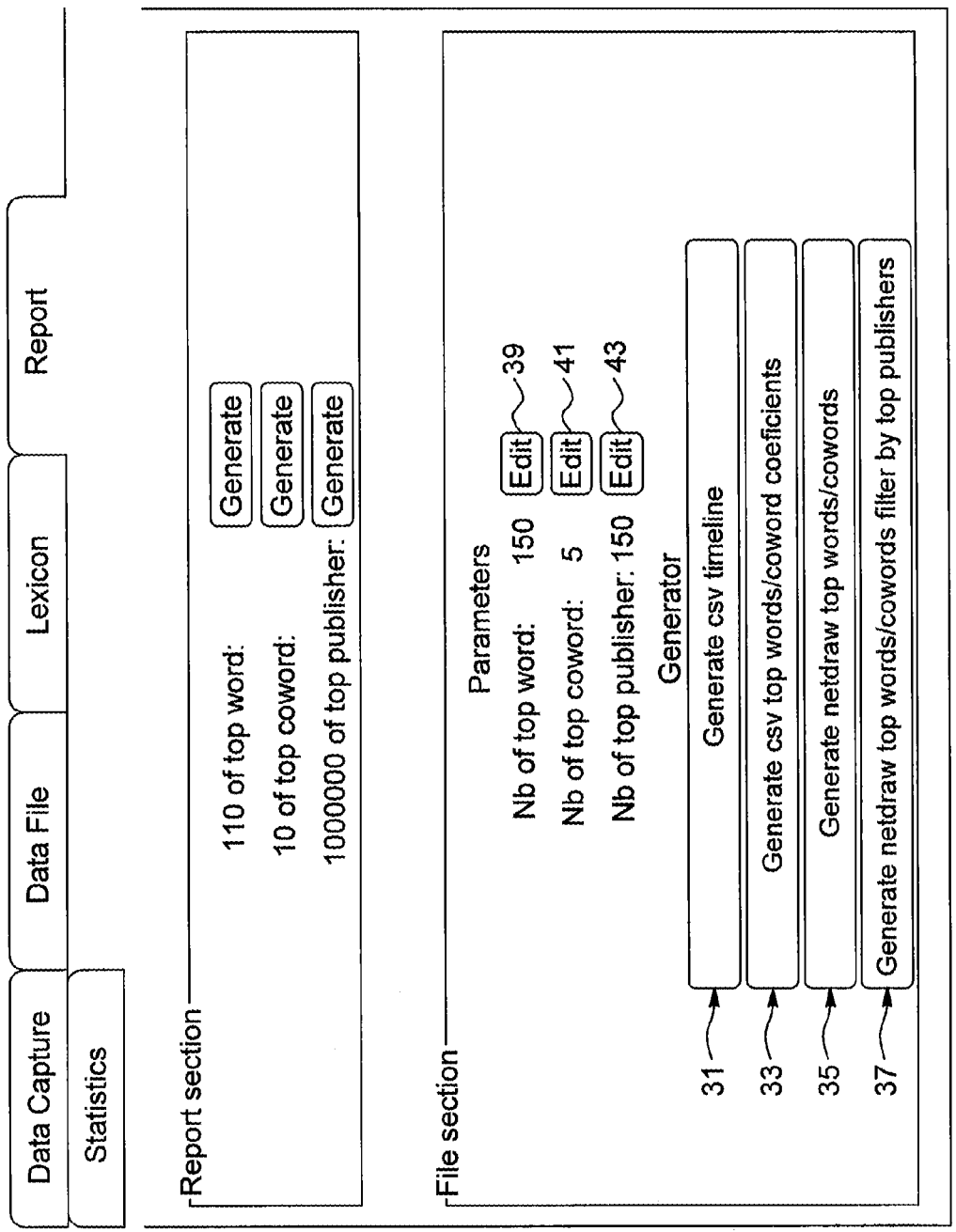
FIG. 6 is a schematic representation of the graphical user interface for the system according to a preferred embodiment of the invention.

The next option allows the viewing of the $K_{ij}$ coefficients used in the co-word analysis used in the lexical mapping, button 33 in FIG. 6.

The output of this file is mostly used for specific investigations and or testing. Its output resembles that shown in FIG. 7, where column A lists the keyword, column B lists the occurrence of the keyword in the various datum of information; column C is the first most co-occurring word with the keyword; column D is the $K_{ij}$ value calculated between the two, and column E is the number of times the co-occurring word occurs with the keyword.

The next function in this subsection is generating the co-word interest graph. Using the co-word analysis process ($K_{ij}$) the co-word interest graph (button 35) generates a network graph of key concepts within the data set. The number of concepts to include on the network graph (i.e. the number of points plotted), and the number of top cowords to include in the output is controlled by the "Nb of top word" and "Nb of top coword" values in the Parameters section (39, 41). In this case the map produced will include the top 150 concepts, and the coword analysis will span across 5 of the nearest top cowords for each concept. The corresponding file is then imported into a graphing package, such as that known as Netdraw™ from Analytic Technologies. It will be recognized that via an API, the map is also available as data formatted in JSON. A sample output can be seen in FIG. 8.

Figure 9:
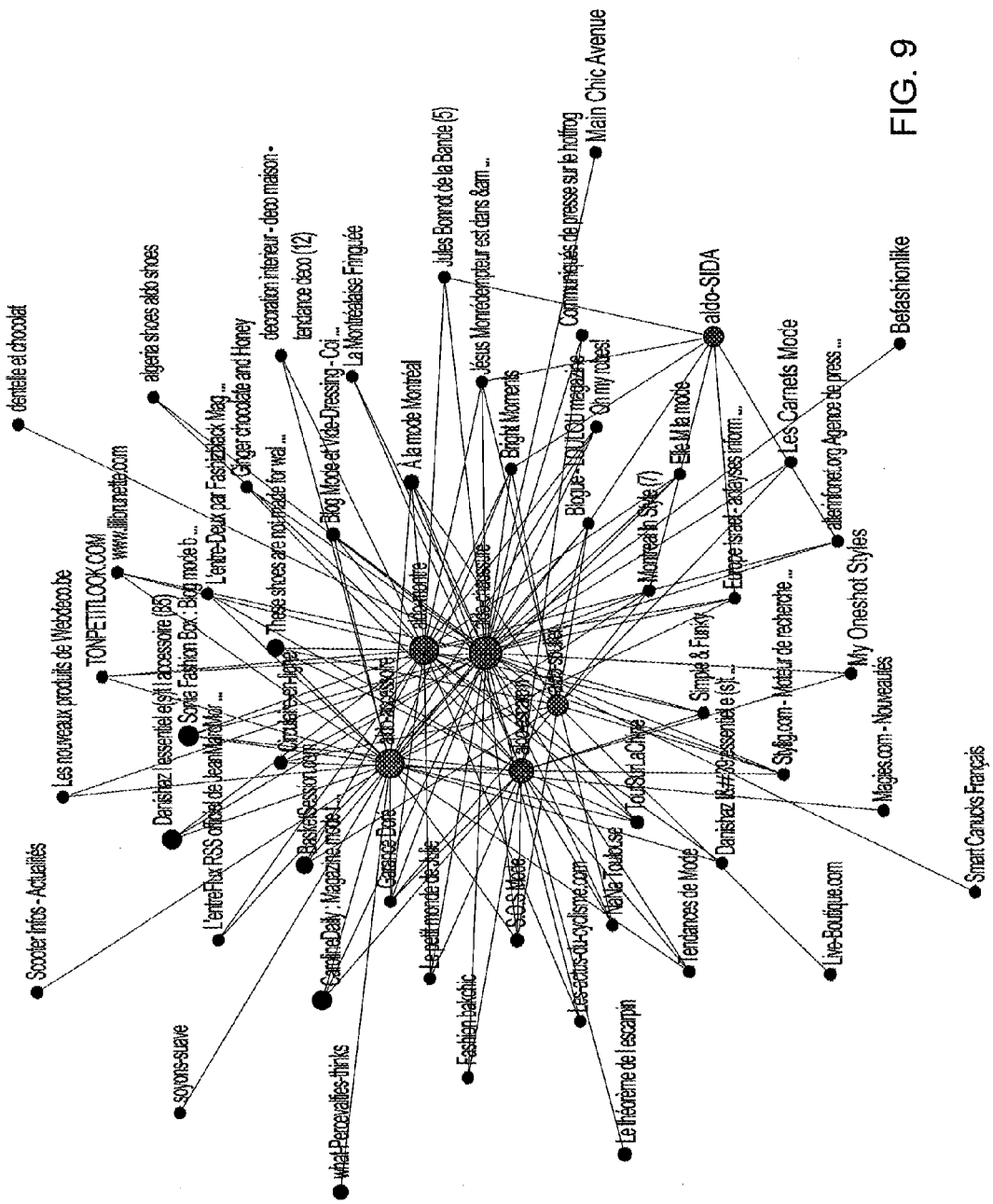
FIG. 9 is a representation of another force directed graph for another search.

Finally, the actors within the data set, also known as Publishers can be graphed as seen in the last button of this subsection FIG. 9.

Publisher in this case corresponds to the publishers within the data set, with number of blog posts associated to each blog producing more influence with other actors within the map. The generated data is plotted as an interest graph using available packages, such as that known as protoviz. An interface layer can be written on top of it, the ease manipulation of the results. The number of points to include on the map is governed by the "Nb of top publisher" value in the Parameters section. See FIG. 10.

Statistics

Finally there is a project statistics panel, which provides information on the project, who has worked on it, and which actions were taken when. It also provides relevant information the data set such as the number of total posts, number of unique posts, query summary, etc., as is well known in the art Functional Description of the Components:

Having this overview in mind, the reader will be better equipped to understand the following functional description of a preferred embodiment of the invention.

The reader will recall the various definitions outlined above, and understand that the following expressions have the following definitions, which are not meant to be limitative, but rather illustrative of the concepts expressed herein. In addition, plain meaning of words used herein is to be followed, unless context dictates differently, and/or a specific, limitative definition has been introduced.

Social Data Format

The data that the system uses can be defined as follows:

Query: set of Boolean expressions used to fetch data

File: unique string used to identify and summarize each query

Publisher: the name given to the Twitter ID, blog title, etc.

Title: the name associated with an individual blog post

Link: This is the URL of the post, for example, "myponyblog.com/post/post1234"

Timestamp: exact time of publication of post

Description: snippet of text that contains the sentence(s) in which the keywords of the Query occur.

Author: name of author of post.

In many cases, the Publisher and the Author will be the same person, but there are circumstances where they will be different. For example if you have a BLOG with one author then the publisher would be the blog, and the author would be the person who posts the piece. In a multi-author blog this becomes more relevant, where the publisher would be the name of the blog and there could be several authors associated with it. The name of the blog is the publisher, not the URL. So for example, "myponyblog.com", is the URL, but it might be called "I Love Ponies Blog!". From the system point of view, "I Love Ponies Blog!" would be the Publisher and "myponyblog.com" would be the link.

As mentioned above, one object of the present invention is to mine social data for valuable information relating to a particular search/project. In order to do so, the system of the present invention is adapted to filter out undesirable entries, such as homonymous data, unrelated conversations with similar key words and of course spam and porn, which clutter the blogosphere.

For the purposes of the present description, spam is generally understood to be an entry which is either invariable (the same text is written over and over again), or can be an entry which doesn't make grammatical sense and is usually not a part of the genuine discussion occurring between humans. This definition of spam will be mainly what the present invention is concerned with, although other forms of spam are covered by the present invention.

Most spam is commonly called "black hat SEO", or black hat search engine optimization. This is the most common form of spam, that is, an entry that is copied verbatim from entry to entry on hundreds sometimes thousands of social media or digital text domains. One way to identify spam (and thus a contrario to identify legitimate entries) is to assume that humans will express the same idea or point, but with differing words. Therefore, an entry which contains some of the keywords searched for, but also contains differences with another entry, will be considered legitimate.

The underlying premise of the system is that a wide search is performed in the text domain, using any number of keywords, phrases, etc., related to a particular topic will yield vast quantities of results, probably far too many that can be humanly analyzed in a reasonable amount of time. Additionally, this search will include in its results many undesirable entries, such as spam, which is "noise" to the "signal" of the legitimate entries sought. The system of the present invention enables the filtering out of the noise, in order to obtain a subset of the search which contains the "signal". Then, the system of the present invention can perform data analysis on the subset in order to yield useful results.

Referring now to FIG. 1, the general components of the system 100 are shown in relation to an embodiment of the process to be followed. From top to bottom, they include the data capture module 101, the fetcher 103, the parser 105, the link stripper 107, the stop word filter 109, the lemmatiser 111, the lexical engine 113, the clustering algorithm 115, the user defined clusters creation 117, and the network force directed graph generation 119. Each of these processes will be detailed hereinafter.

Search Design Module

The search design module is where the social data is obtained. This module includes a query builder for each of the sources of social media data or a direct import option for other sources of social data. It allows to user to manage a large number of data queries with options to edit, copy, preview the data from and selectively import queries. This module is fairly standard, and will not be expanded upon further.

Fetcher

The queries are then constructed for each source of social media data along the rules set out via the APIs of the respective social media data sources. The code that interfaces with these APIs and retrieves the data are called "fetchers"

Once the queries have been designed and tested one can import the data into the system.

Fetchers are well known in the art, and as built according to the specifications and information contained in the APIs. As each API is different, and in that each query must respect the syntax set out in the respective API, no additional detail is provided herein.

Parser

This information once fetched, is then passed through a parser. The parser receives the data from the fetcher and builds a database (for ease of reference, this database can be referred to as the parsed database). The parser groups the fields from a specific data set into a general data class, of which the most important are a timestamp, publisher and description. Other fields in the database include link, which is a hyperlink to the actual post entry. The database also include a field called author and will be populated if the name of the author is different from that of the publisher.

Link Remover

The link remover then performs the following actions on the dataset, which is contained in the parsed database.

For each row of data, the link remover will check against a known list (pre-populated) of URLs that have been blacklisted for any number of reasons. For example, URLs can be blacklisted because they were unreachable. This blacklist is constructed automatically and updated by the link remover as it cleans the data.

If the URL of a given entry has not been blacklisted, the link remover will check to see if the page exists already in the database. If the page already exists, the page will be loaded and if it has not been cached, the link remover will obtain the page from the Internet.

It should be noted that one way of blacklisting a URL is that if the URL does not load after several pre-determined attempts, the URL will then be blacklisted and the remover moves on to the next row of data in the database.

Once a page is successfully loaded, the link remover will remove from the pages any links, ad sections and non-content sections such as headers and side bars. The remaining text is then tested against the lemmatization searches (query) that originally retrieved the blog post to see if the entry is still relevant. If the entry does not match the lemmatization searches, the entry is then removed from the data set and the link remover will proceed to the next data.

As is well-known in the art, the link remover further includes a statistics module to indicate how many rows of data were processed, how many were rejected, how much time it took, etc.

Lexicon Management Module 131

The lexicon management module uses an automatic lemmatiser which creates the lemmatized dictionary automatically using linguistic heuristics.

In the lexical management module, a number of sub-modules exist to further refine the data before substantive analysis is performed thereon.

Stop Words

A first sub-module is the stop word sub-module. The stop word sub-module is a list of words that are to be removed after the searches have downloaded the data, but before any subsequent processing is completed on the raw data. The stop word list removes words which may not have any linguistic value in the context of lexical analysis.

The stop word module produces an unedited lexicon 110, which results in a table 112.

Lemmatizer

Subsequent to the removal of the stop words from the raw data, the data is then passed through a lemmatizer. The lemmatizer is a module which recognizes "lemmas" or root words or roots of various words. In essence, the lemmatizer will take a data entry and extract therefrom the roots of the various words that are used therein and produce a list of "lemmas" These lemmas are then added as an extra column in the lexicon table next to the associated syntactical version of a given word or a concept 116

The lexicon table is then used as a replacement hash table to replace all instances of the syntactical versions of the word with its corresponding lemma.

This information is output in a file called "Edited Lexicon" 114.

Data Manager 133

The data manager 133 enables the data captured to be uploaded or downloaded, and analyzed. As with the lexical management module, the data manager includes sub-modules.

Lexical Engine 113

In the data manager 133, a main step is to pass the data through a lexical engine.

The edited lexicon 114 is used to produce the interest graph of corpus or set of posts.

The first step in the lexical analysis is the correlation of all words, after the removal of the stop words, and where each word in the original post is replaced by its appropriate lemma. For each post, a calculation is performed of how often each lemma occurs with another lemma. This correlation per post per lemma is referred to as $c_{ij}$. If a lemma occurs more than once in a post, its correlation with the other lemma is incremented.

For each post, a correlation table 118 is updated. If a new correlation is found between two words or lemmas in the post, a new entry is created in the table 118 to that specific $c_{ij}$. If the correlation exists, the number of correlations will be incremented to the running total in a correlation table.

Once all the posts have been processed in this manner, the result is a total correlation parameter between all the combinations of posts which is referred to as $C_{ij}$.

Once all the posts have been processed, it is possible to determine the total frequency of each word $F_i$.

The tabulated $F_i$, $F_j$, $C_{ij}$, is then used to calculated the $K_{ij}$ for all the combinations of words, where $K_{ij}=C_{ij}^2$ over $F_iF_j$.

The $K_{ij}$ is the basis for the "clustering" of the data.

Clusters of lemma's that are more related to each other than the main discussion are identified using a $K_{ij}$ recombination algorithm. For example, all lemmas that have a $K_{ij}>0.95$ are concatenated into one "artificial" word. The frequency of the concatenated word is the addition of the two $F_i+F_j$. In a sense, this is a recombining of words that are close together. This can be used to create phrases of ideas that are associated with a node.

Clustering Algorithm

The clustering aspect starts by obtaining the standard deviation of Kij. Every relation where Kij is greater than the standard deviation is grouped by pack of relationships, and the clusters are so formed.

Filters

There is also an advanced filter system that allows various filtering operations on the data to be performed. The user may data over a specified time range or slice. Also there the user may search for various keywords in the data set or apply multiple filters. This allows the user to narrow the view on the data set or further clean the data as needed. Furthermore various interactive features of the data sculpting use the filter engine as the basis of the sculpting by adding custom filters based on user inputs in the map.

Network Force Directed Graph

A standard open source force directed graph utility is used to display the lexical analysis, protovis (http://mbostock.github.com/protovis/)

Figure 8:
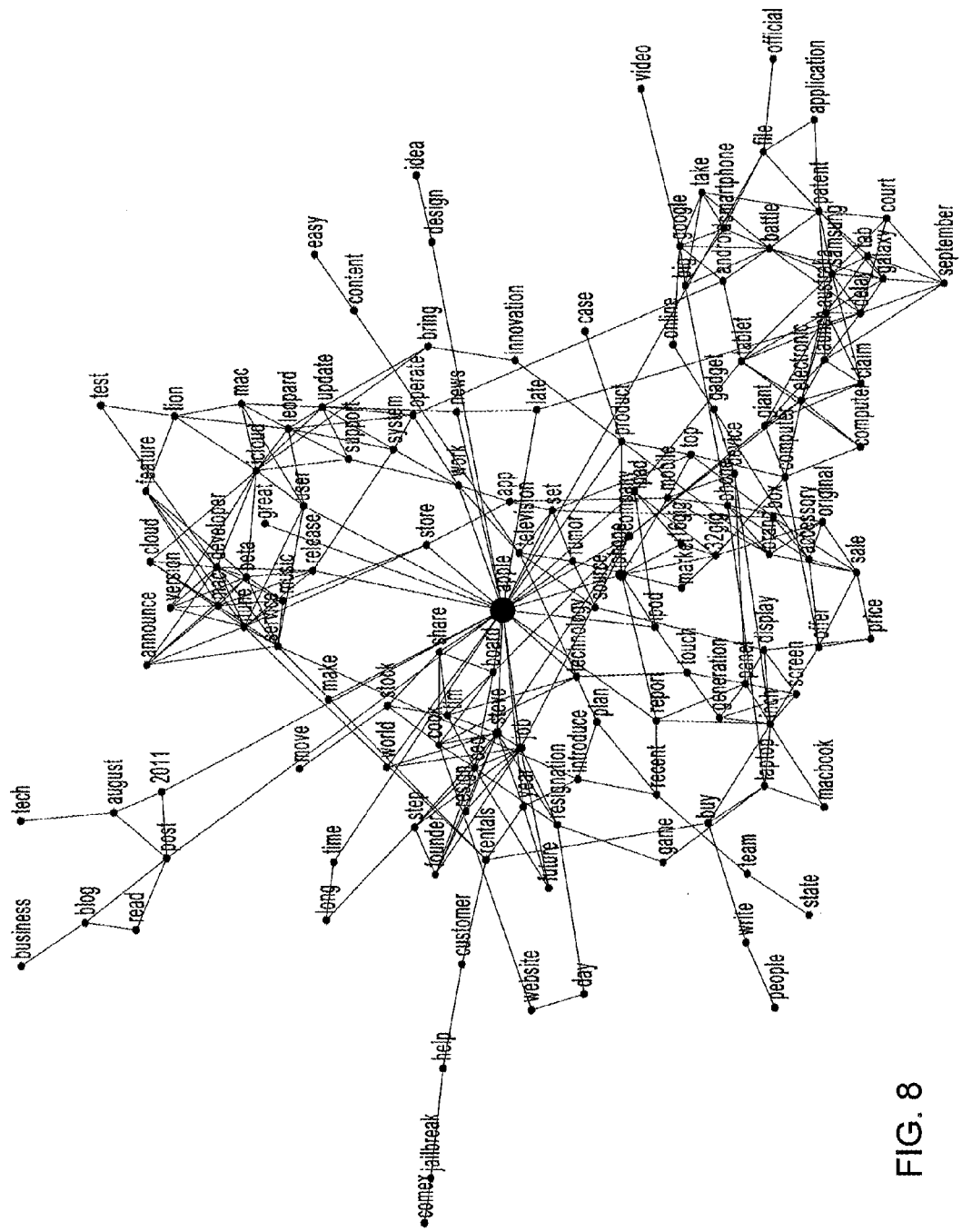
FIG. 8 is a representation of a force directed graph for one search, showing the nodes connected to each other.
Figure 10:
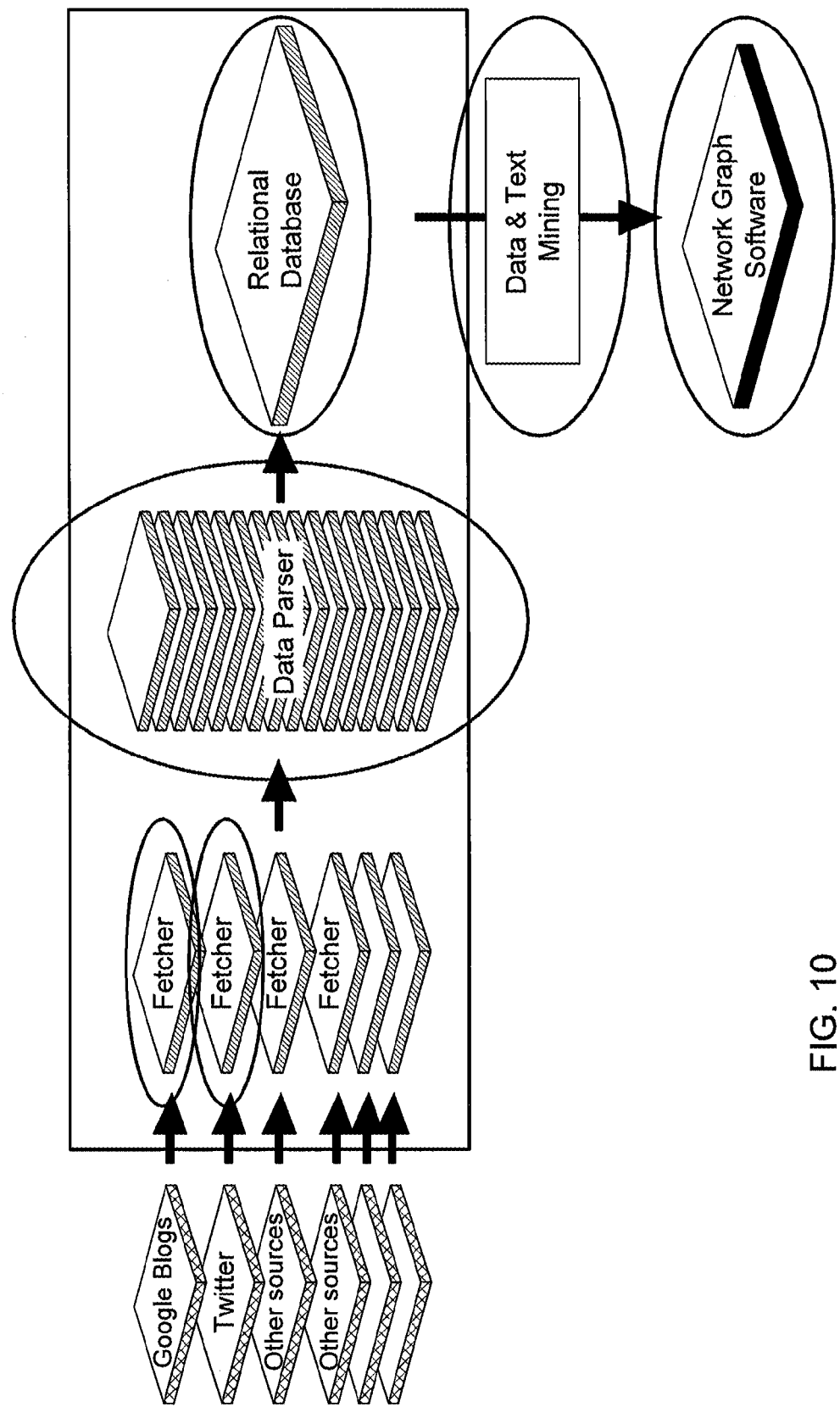
FIG. 10 is a schematic representation of the modules used in the present invention, according to a preferred embodiment.

The parameters of the force directed graph are the spring constant k, the rest length of the spring I_0, and the force between two nodes. For example, each node is allowed to have a maximum of N outgoing partners (or a different value set programmatically by the user), with no limit on the number of incoming partners. The N co-words with highest values of the $K_{ij}$ that have a minimum $K_{ij}$ value of, for example, 0.025 (this value is also user selectable) are then connected using the values for the parameters outlined above. If the words have less than 5 cowords with $K_{ij}>K_{ijmin}$, then that node only has n connections, where n is the number of co-words with $K_{ij}>K_{ijmin}$. For example, as shown in FIGS. 8 and 10, N=5.

Conversation Sculpting

Word combinations identified in the clustering algorithms are highlighted in the force directed graph, by changing the link width and color between these word combinations. These clusters are suggested to the user for examination; if the user so decides he may remove the sources of unrelated texts. Nodes are made clickable on the force directed graph, when one of these words is clicked the closest $K_{ij}$ partners are highlighted. The user is allowed to click a co-word pair, if the user so decides at that point all points containing both words in the pair are removed from the dataset and the lexical engine is re-launched (all steps are repeated) and a new force directed graph is created with the new $K_{ij}$'s.

Figure 11:
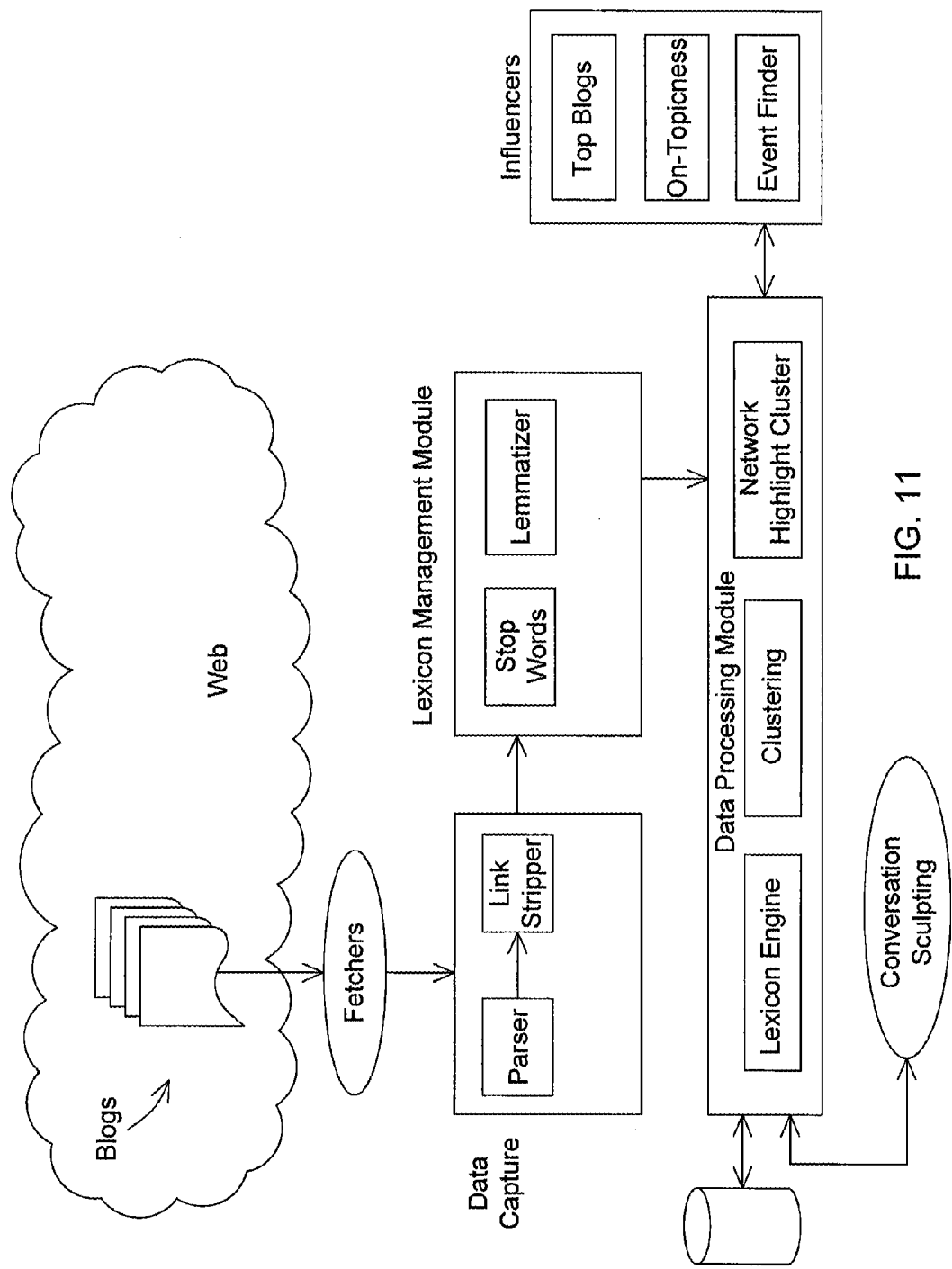
FIG. 11 is a schematic representation of the components used in the present invention, according to a preferred embodiment.

As will be explained below, there can be three parts to "Conversation Sculpting", resulting from an interaction with the Lexical Map (like the one in FIG. 11).

The first two parts in Conversation Sculpting involve removing data from the lexicon.

The first part is to remove words from displaying on the map. The map is essentially a display of the co-words that are derived from the Lexicon. Assuming that a parameter has been selected to display the top 200 words on the map, one can remove, for example, words in the $45^{th}$, $70^{th}$, $104^{th}$, and $190^{th}$ position (this entails removing four words from the lexicon as well, because the lexicon is the source of the words being mapped). The position ($45^{th}$, $70^{th}$, etc.) is ordered by $K_{ij}$ or Frequency. So $45^{th}$ would be the $45^{th}$ most frequent word on the map, etc. Thus there are now 196 words on the map. When the map is replotted, the effect is that the four words below 200 the top 200 now have space to move up into the top 200, and so these new words appear on the map, including their relationships to the rest of the words. In this way by repeating iterations of this, we can remove frequent but uninteresting words, allowing less frequent but more interesting words to rise above the top 200 cutoff and onto the map. In this first action only words are removed from the lexicon.

Figure 12:
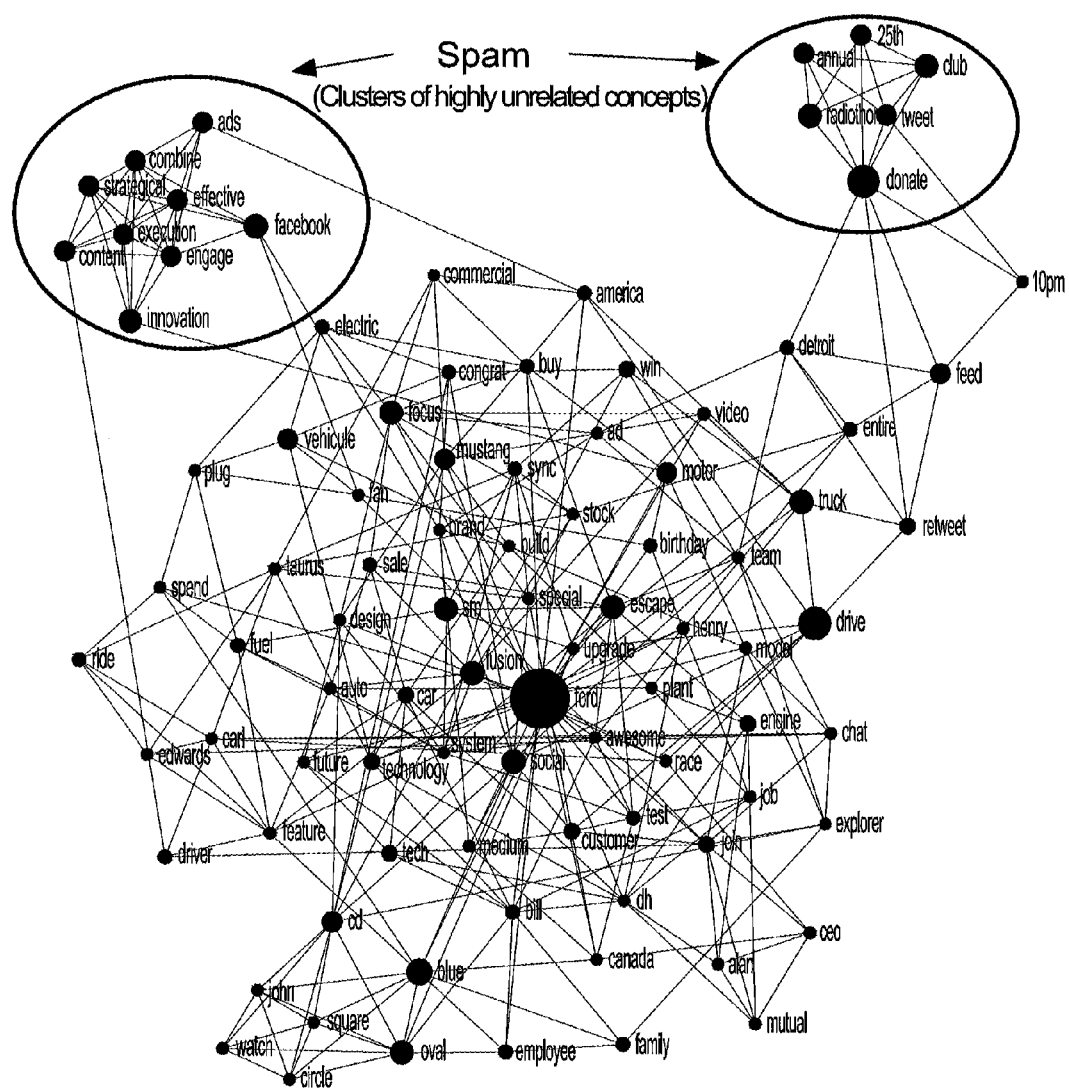
FIG. 12 is a representation of a force directed graph for a search, where two clusters of unrelated keywords appear.

The second action that can occur, is in finding that if you find a word on the map that is irrelevant or uninteresting, it is possible to filter out all the posts (i.e. actual data that the lexicon is derived from) from the system. Thus when the lexicon is regenerated, the word and none of its related data (words) show up on the map. Referring to FIG. 12 it can be seen that there are two circles of "spam". It is highly likely that these words all come from repeats of one post. And so if we "remove all posts" that contain one of these words, we would remove the entire cluster as the source data would no longer be in the system.

The third action that can occur is where two or more nodes on the graph could be selected, and then subsequently combined. During this combining either one primary node could be selected as the name for the new combined node, or an entirely new name for the new node could be selected. Thus if the words "badger", "beer" and "super" appear on the map, all three could be selected and regrouped under the node "badger". All subsequent calculations, such as map relationships would treat all the data as part of this node. Or alternatively all three nodes could be regrouped under one node titled "super-beer-badger". This node would then appear on the map as a single word.

Once the undesirable entries have been excised, the data is fed through the data manager in order to further refine the results. This process can be repeated as often as wanted, in order to obtain the granularity of detail desired by the user. An advantage of the present invention is that it enables a user to visually identify a portion of the results of the keyword search that are not actually relevant to the investigation, such as results that contain spam, or other undesirable entries.

It can be seen then that the present invention allows for visually identifying spam in a conversation. One of the assumptions underlying the embodiments of the present invention is that spam is "closely related", i.e. contains words that occur together in the text, but do not relate to the main concepts as seen in the center of the map. In FIG. 12, when looking at the circles of spam, it can be seen that there are only three or four interconnections, whereas most of the other items on the map have many more interconnections. The advantage of using a force directed graph (spring system) is that the items with many interconnections are pulled toward the center of the map, where they interconnect, and the items with less interconnections are pushed to the outside of the map.

Context/Content Based Influencer Finder

In addition to focusing the results on the "signal", the system and method of the present invention allow a variety of statistical analyses on the data, in order to extract useful information. The following analyses are exemplary only, and the skilled reader will appreciate that many different types of analyses can be performed on the refined (or unrefined) dataset.

Simple "Top Publisher" Identification:

The Top Publishers are determined simply by counting the number of times the publisher has published in all of the queries. $F\_pi\_tot$=Sum of $f\_pi$, for j=1 to the total number of queries, q_tot This of course leads to counting some posts twice in the tabulation, as publishers who write posts that contain more than one of the keywords required in the many queries will be counted for each time they mention one of the keywords in a post—this is referred to as "overcounting". This is a desired effect, bringing out publishers that are "on topic", publishing with the exact context that is captured by the ensemble of queries.

"On-Topicness" Ratio, R_ot

Publishers that do not publish frequently but who are publishing on topic pose a difficult problem, as they may be early stage influencers and represent relevant "signal" voices that may be buried by noise and publishers that publish frequently on fewer keyword, using the ratio of "overcounting" described in the previous section. That ratio of overcounting to unique posts gives a measure of how many key words a publisher mentions per post. The higher the overcounting ratio the more "on topic" the publisher is no matter how frequently he/she publishes. This can be illustrated by the following relation:

$$R\_ot\_p=(F\_pi\_tot/F\_unique\_pi)/N\_queries$$

Where $F\_pi\_tot$=total number of counts of the publisher over all queries $F\_unique\_pi$=number of unique posts for a given publisher $N\_queries$=total number of queries used to create the dataset By dividing by the total number of queries in the dataset we normalize the ratio to have a maximum of one. A publisher mentioning all of the keywords in every blog post will have a $R\_ot\_p=1$.

"Event Finder"

The event finder uses a set of approximately 13,500 lemmas organized into 31 categories called "aspects". They are called them aspects because they were organized to reflect aspects of human activity. This work was done by the University of Auckland and the University of Texas, details and references are provided here: http://www.liwc.net/

Figure 13:
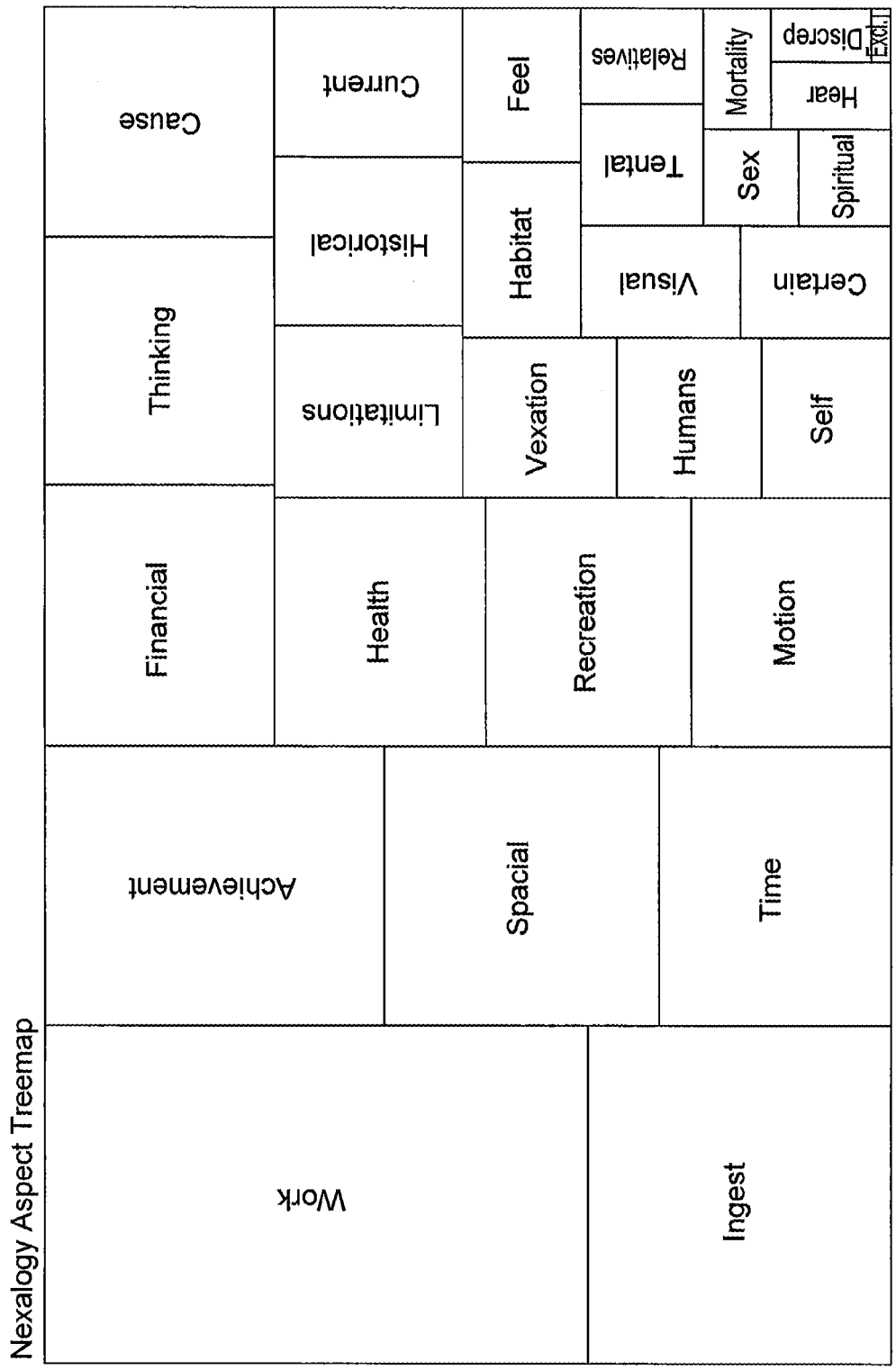
FIG. 13 is a schematic representation of the relative percentage of data that each aspect represents in a given search.

Once the data has been processed in the lemmatizer, where all of the different syntaxes of each lemma are replaced by the lemma in the edited lexical, one can filter and tag these lemma by which aspect the lemma in each post mentions. These aspects tags are then added to database for each post. A summary graph of the percentage of data that each aspect represents is shown in FIG. 13.

The number of aspect tags for each aspect is then tabulated, the total tags for each aspect are binned by day or another convenient time frame, the default being by day. The bin average for each aspect tag is then tabulated over the entire time of the dataset. The standard deviation for each aspect is then calculated using the daily (or hourly, or weekly, etc.) average as the mean of a Gaussian distribution.

Figure 14:
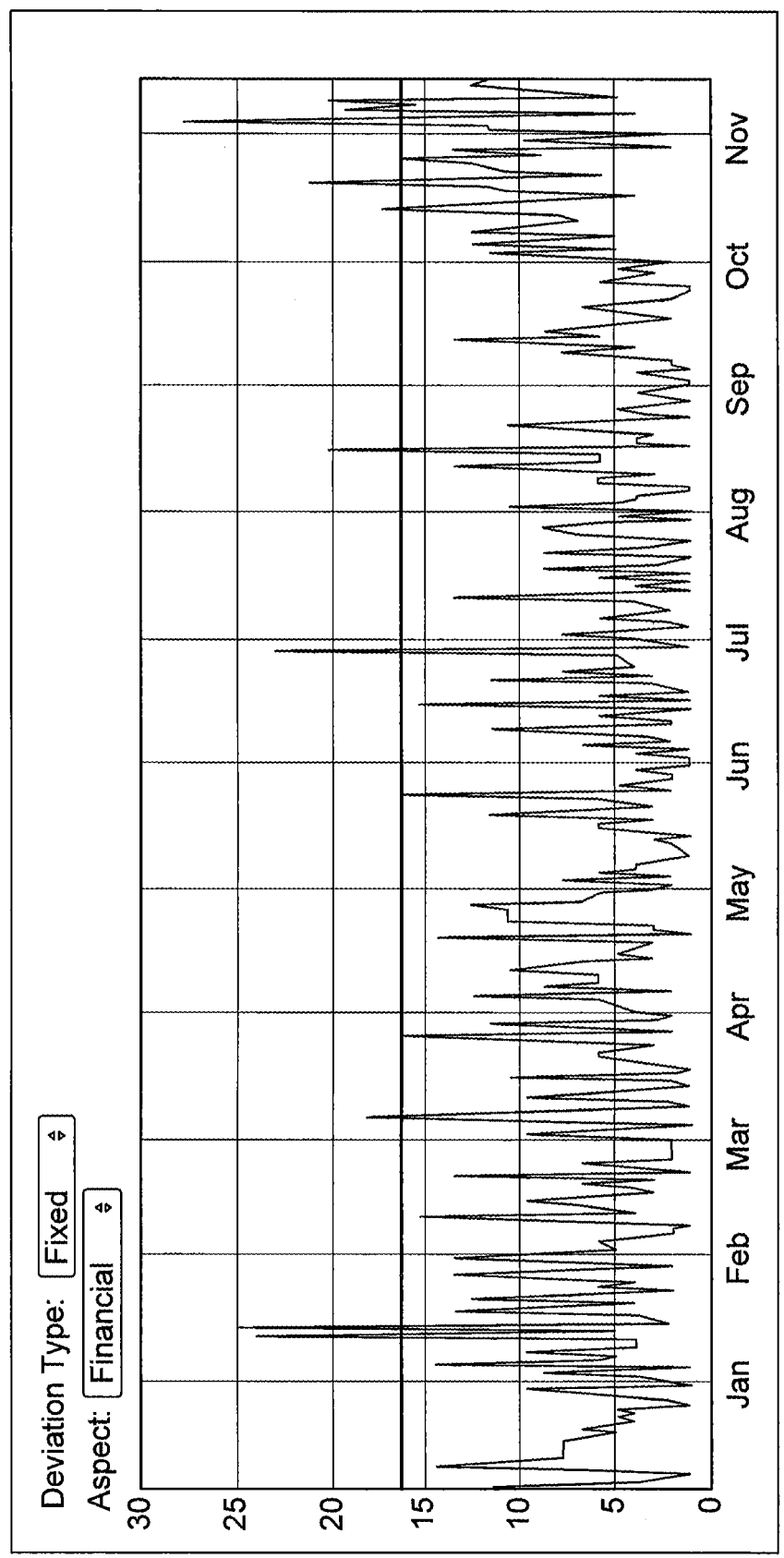
FIG. 14 shows a graph of the standard deviation (straight line just above 15) and a single aspect timeline of the aspects uncovered in a conversation.

Aspects that have more than 2 standard deviations away from the mean for any day in the data set are then flagged as aspect "events", i.e. an anger event if there the anger aspect tags exceed more than 2 standard deviations away from the daily average anger aspect tag, as shown in FIG. 14.

Figure 15:
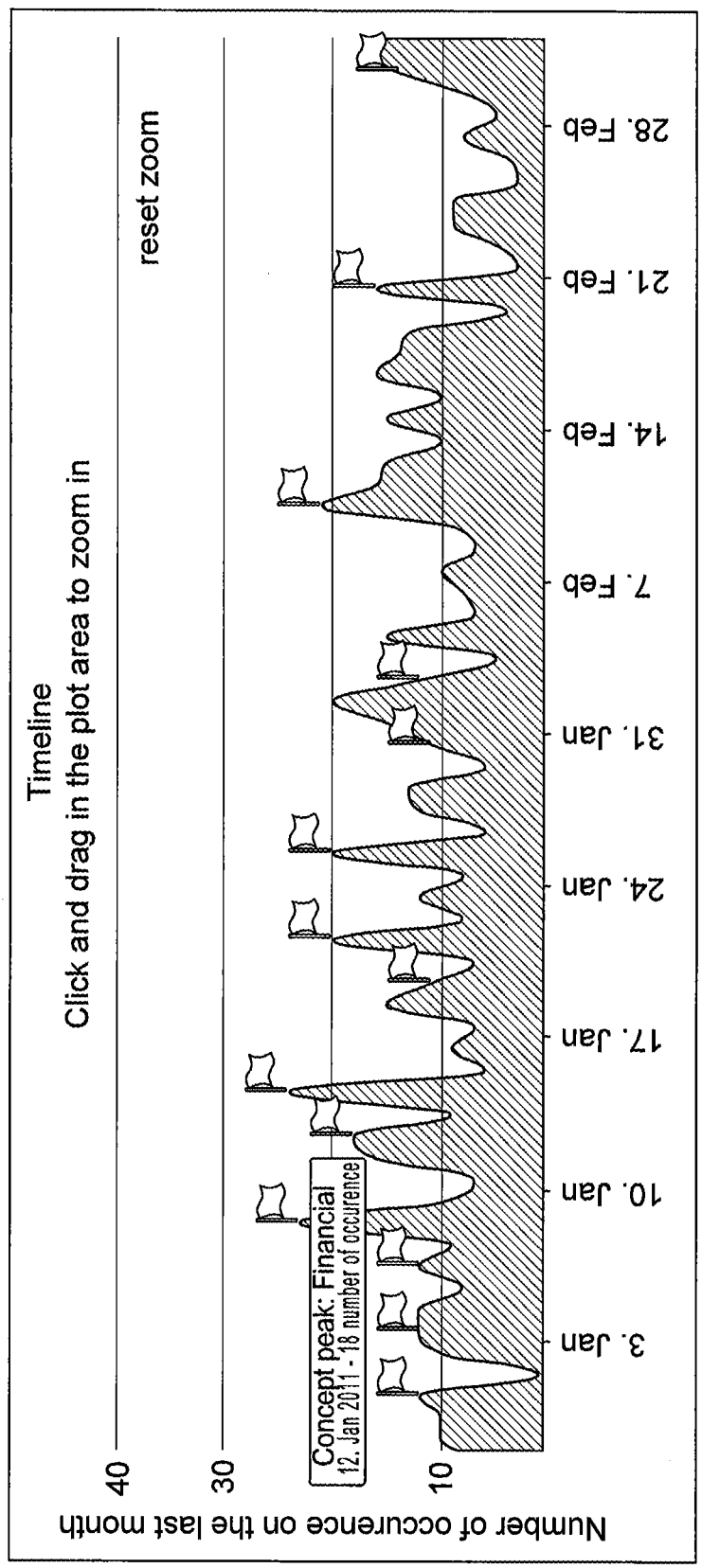
FIG. 15 shows a graph of flagged events calculated from the single aspect timeline of FIG. 14.

Subsequently, all the aspects are graphed on a timeline of the dataset to show all the events detected within it. As is well known in the art, the system is adapted to permit the user to drill down and explore the data, as shown in FIG. 15. Note that this graph includes all detected events across all aspects, and each flag indicates activity at or above two standard deviations.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. A method for visually identifying spam in a text-based dataset, comprising the steps of:

calculating, via a lexicon engine of a data processing module, a correlation $K_{ij}$ between combinations of words, wherein $K_{ij}$ is a coefficient between a correlation parameter $C_{ij}$ of lemmas i with lemmas j, over $F_iF_j$, where $F_i$ is frequency of word i and $F_j$ is frequency of word j;

concatenating lemmas that have a correlation $K_{ij}$ above a predetermined level into an artificial word via the lexicon engine;

recalculating, via the lexicon engine, a correlation $K_{ij}$ between combinations of words in an expanded dataset comprised of said text-based dataset and artificial words obtained by concatenation;

repeating the steps above for N lemmas; and using a force directed graph to visually display, via a display in communication with the data processing module, the results obtained above into separate conversations, wherein each node in the graph has N outgoing partners, and the N co-words with the highest value of $K_{ij}$ above a minimum value are connected together.

2. A method according to claim 1, wherein N=5.

3. A method according to claim 1, wherein said step of calculating a correlation $K_{ij}$ between combinations of words includes the following steps performed by the lexicon engine of the data processing module:

replacing each word in said dataset with a lemma;

correlating each lemma with every other lemma to provide a value $c_{ij}$, wherein $c_{ij}$ is the frequency of lemma i with lemma j;

calculating a correlation parameter $C_{ij}$ between all combinations of entries;

determining a frequency of each lemma $F_i$;

calculating said correlation $K_{ij}$ according to the relation $K_{ij}=C_{ij}^2$ over $F_iF_j$, wherein $F_i$ is a frequency of a word i, $F_j$ is a frequency of a word j, and $F_iF_j$ is the product of frequency of word i and frequency of word j.

4. A method for visually identifying a conversation in a text-based dataset, comprising the steps of:

calculating, via a lexicon engine of a data processing module, a correlation $K_{ij}$ between combinations of words, wherein $K_{ij}$ is a coefficient between a correlation parameter $C_{ij}$ of lemmas i with lemmas j, over $F_iF_j$, where $F_i$ is frequency of word i and $F_j$ is frequency of word j;

concatenating lemmas that have a correlation $K_{ij}$ above a predetermined level into an artificial word via the lexicon engine;

recalculating, via the lexicon engine, a correlation $K_{ij}$ between combinations of words in an expanded dataset comprised of said text-based dataset and artificial words obtained by concatenation;

repeating the steps above for N lemmas; and using a force directed graph to visually display the results obtained above via a display in communication with the data processing module, wherein each node in the graph has N outgoing partners, and the N co-words with the highest value of $K_{ij}$ above a minimum value are connected together, wherein cluster values that are less correlated to a main cluster are pushed toward an outside of said graph, to permit visual identification of the conversation that is less related to a center region of said graph.

5. A method for the clustering of related terms into separate conversation in a text-based dataset, comprising the steps of:

calculating, via a lexicon engine of a data processing module, a correlation $K_{ij}$ between combinations of words, wherein $K_{ij}$ is a coefficient between a correlation parameter $C_{ij}$ of lemmas i with lemmas j, over $F_iF_j$, where $F_i$ is frequency of word i and $F_j$ is frequency of word j;

concatenating lemmas that have a correlation $K_{ij}$ above a predetermined level into an artificial word via the lexicon engine;

recalculating, via the lexicon engine, a correlation $K_{ij}$ between combinations of words in an expanded dataset comprised of said text-based dataset and artificial words obtained by concatenation;

repeating the steps above for N lemmas; and using a force directed graph to visually display, via a display in communication with the data processing module, the results obtained above into separate conversations, wherein each node in the graph has N outgoing partners, and the N co-words with the highest value of $K_{ij}$ above a minimum value are connected together.

6. A method according to claim 5, wherein N=5.

7. A method according to claim 5, wherein said step of calculating a correlation $K_{ij}$ between combinations of words includes the following steps performed by the lexicon engine:

replacing each word in said dataset with a lemma;

correlating each lemma with every other lemma to provide a value $c_{ij}$, wherein $c_{ij}$ is the frequency of lemma i with lemma j;

calculating a correlation parameter $C_{ij}$ between all combinations of entries;

determining a frequency of each lemma $F_i$;

calculating said correlation $K_{ij}$ according to the relation $K_{ij}=C_{ij}^2$ over $F_iF_j$, wherein $F_i$ is a frequency of a word i, $F_j$ is a frequency of a word j, and $F_iF_j$ is the product of frequency of word i and frequency of word j.

* * * * *